(12) United States Patent
Torita et al.

(10) Patent No.: US 10,903,515 B2
(45) Date of Patent: Jan. 26, 2021

(54) NON-AQUEOUS ELECTROLYTE SECONDARY BATTERY

(71) Applicant: Toyota Jidosha Kabushiki Kaisha, Toyota (JP)

(72) Inventors: Koji Torita, Nagoya (JP); Harunari Shimamura, Toyonaka (JP); Yusuke Fukumoto, Toyonaka (JP); Akihiro Ochiai, Toyonaka (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 88 days.

(21) Appl. No.: 16/253,923

(22) Filed: Jan. 22, 2019

(65) Prior Publication Data
US 2019/0229367 A1 Jul. 25, 2019

(30) Foreign Application Priority Data
Jan. 22, 2018 (JP) ................................. 2018-008310

(51) Int. Cl.
*H01M 4/66* (2006.01)
*H01M 10/0525* (2010.01)
*H01M 10/0587* (2010.01)
*H01M 4/70* (2006.01)
(Continued)

(52) U.S. Cl.
CPC ......... *H01M 10/0525* (2013.01); *H01M 4/13* (2013.01); *H01M 4/667* (2013.01); *H01M 4/668* (2013.01); *H01M 4/70* (2013.01); *H01M 10/0587* (2013.01); *H01M 2004/021* (2013.01);
(Continued)

(58) Field of Classification Search
None
See application file for complete search history.

(56) References Cited

U.S. PATENT DOCUMENTS 5,468,571 A * 11/1995 Fujimoto ............... H01M 4/587
429/217
2011/0159364 A1 6/2011 Nishinaka et al.
(Continued)

FOREIGN PATENT DOCUMENTS

| JP | 2000277146 A | 10/2000 |
|---|---|---|
| JP | 2011138693 A | 7/2011 |
| WO | 2012005301 A1 | 1/2012 |

*Primary Examiner* — Yoshitoshi Takeuchi
(74) *Attorney, Agent, or Firm* — Dinsmore & Shohl LLP

(57) ABSTRACT

A non-aqueous electrolyte secondary battery includes at least a positive electrode, a negative electrode, a separator, and a non-aqueous electrolyte. The positive electrode includes a positive electrode current collector, a protection layer, and a positive electrode composite material layer. The protection layer, arranged between the positive electrode current collector and positive electrode composite material layer, includes at least a first and second protection layer. The first protection layer, arranged on a surface of the positive electrode current collector, contains a first conductive material and a first resin being a non-thermoplastic polyimide resin. The second protection layer, arranged on a surface of the first protection layer, contains at least a second conductive material and a resin A being a thermoplastic resin. A melting point of the resin A is lower than a thermal decomposition temperature of the first resin. The resin A is greater in expansion coefficient than the first resin.

7 Claims, 5 Drawing Sheets

(51) Int. Cl.
*H01M 4/13* (2010.01)
*H01M 4/02* (2006.01)
(52) U.S. Cl.
CPC ............. *H01M 2004/027* (2013.01); *H01M 2004/028* (2013.01)

(56) References Cited

U.S. PATENT DOCUMENTS

2012/0237824 A1* 9/2012 Koh ................ H01M 4/667
429/211
2013/0089781 A1 4/2013 Miyazaki et al.
2017/0309970 A1* 10/2017 Kim ................ H01M 4/139

\* cited by examiner

NON-AQUEOUS ELECTROLYTE SECONDARY BATTERY

CROSS REFERENCE TO RELATED APPLICATIONS

This nonprovisional application claims priority to Japanese Patent Application 2018-008310 filed with the Japan Patent Office on Jan. 22, 2018, the entire contents of which are hereby incorporated by reference.

BACKGROUND

Field

The present disclosure relates to a non-aqueous electrolyte secondary battery.

Description of the Background Art

WO2012/005301 discloses an electrode body in which an undercoat layer (a protection layer) is arranged between a positive electrode current collector and a positive electrode composite material layer. The protection layer contains an organic binder and a conductive material. The organic binder and the conductive material are considered to evaporate or decompose when they are heated to a prescribed temperature or higher.

SUMMARY

Formation of a protection layer between a positive electrode composite material layer and a positive electrode current collector has been studied as described above. By forming such a protection layer, suppression of increase in temperature of a battery at the time of occurrence of an abnormal condition such as nail penetration is expected.

The protection layer disclosed in WO2012/005301 contains an organic binder and a conductive material. The organic binder and the conductive material are considered as being greatly different from each other in rate of thermal expansion. Therefore, when nail penetration occurs, a void (a fracture) may be produced in such a protection layer due to the difference in rate of thermal expansion. When the void becomes larger, the protection layer may peel off from the positive electrode current collector and the nail and the positive electrode current collector may come in contact with each other. Consequently, increase in temperature of the battery may not sufficiently be suppressed.

An object of the present disclosure is to provide a non-aqueous electrolyte secondary battery of which increase in temperature at the time of nail penetration is suppressed.

Technical features and functions and effects of the present disclosure will be described below. A functional mechanism of the present disclosure, however, includes presumption. The scope of claims should not be limited by whether or not the functional mechanism is correct.

[1] A non-aqueous electrolyte secondary battery includes at least a positive electrode, a negative electrode, a separator, and a non-aqueous electrolyte. The positive electrode includes a positive electrode current collector, a protection layer, and a positive electrode composite material layer. The protection layer is arranged between the positive electrode current collector and the positive electrode composite material layer. The protection layer includes at least a first protection layer and a second protection layer. The first protection layer is arranged on a surface of the positive electrode current collector. The first protection layer contains a first conductive material and a first resin. The first resin is a non-thermoplastic polyimide resin. The second protection layer is arranged on a surface of the first protection layer. The second protection layer contains at least a second conductive material and a resin A. Resin A is a thermoplastic resin. A melting point of resin A is lower than a thermal decomposition temperature of the first resin. Resin A is greater in expansion coefficient than the first resin.

FIG. 1 is a first conceptual cross-sectional view for illustrating a functional mechanism of the present disclosure.

FIG. 1 shows a cross-section in a direction of thickness of a part of a positive electrode. FIG. 1 shows a protection layer 10. The positive electrode includes a positive electrode current collector 101, protection layer 10, and a positive electrode composite material layer 102. Protection layer 10 is arranged between positive electrode current collector 101 and positive electrode composite material layer 102. Protection layer 10 includes at least a first protection layer 11 and a second protection layer 12. First protection layer 11 is arranged on a surface of positive electrode current collector 101. First protection layer 11 contains a first conductive material and a first resin. The first resin is a non-thermoplastic polyimide resin. Second protection layer 12 is arranged on a surface of first protection layer 11. Second protection layer 12 contains at least a second conductive material and resin A. Resin A is a thermoplastic resin.

In general, when nail penetration occurs, a positive electrode and a negative electrode are short-circuited at a low resistance through the nail which is a low resistance element, and high Joule heat is generated. Such Joule heat melts a separator around the nail, the positive and negative electrode composite material layers are in contact with each other, a higher short-circuiting current continues to flow, and heat is generated, which leads to thermal runaway. In addition to short-circuiting through the nail, when the positive electrode (negative electrode) current collector comes in direct contact with the negative electrode (positive electrode) composite material layer, short-circuiting occurs, which results in further thermal runaway.

When a nail is driven into a non-aqueous electrolyte secondary battery (which is simply also denoted as a "battery" below) according to the present disclosure, phenomena (1) to (4) below may occur. Increase in temperature of the battery at the time of nail penetration is suppressed by interaction between these phenomena.

(1) Short-circuiting occurs in a part as a result of the nail driven into the battery and a temperature locally increases in the battery due to Joule heat.

(2) Resin A contained in second protection layer 12 is greater in expansion coefficient than the first resin contained in first protection layer 11. Therefore, with increase in temperature of the battery, second protection layer 12 containing resin A is considered to expand to cover first protection layer 11. It is thus considered that separation between first protection layer 11 and second protection layer 12 due to nail penetration is prevented.

(3) The melting point of resin A contained in second protection layer 12 is lower than the thermal decomposition temperature of the first resin contained in first protection layer 11. Resin A is considered to melt and be liquefied with increase in temperature of the battery. Therefore, when a void is produced in first protection layer 11, liquefied resin A contained in second protection layer 12 is considered to enter the void and adhere. It is thus considered that separation of first protection layer 11 from positive electrode current collector 101 due to the void and exposure of positive electrode current collector 101 are prevented.

(4) Molten and liquefied resin A is considered to adhere to an outer surface of the nail. It is thus considered that lowering in short-circuiting resistance at the time of nail penetration is suppressed and increase in temperature of the battery at the time of nail penetration is suppressed.

[2] Resin A may be at least one selected from the group consisting of polyvinylidene difluoride (PVDF), polyethylene, polycarbonate, silicone rubber, polyethylene terephthalate (PET), fluorine rubber, and polytetrafluoroethylene (PTFE). Since these resins are low in melting point and large in expansion coefficient, they noticeably achieve suppression of increase in temperature of the battery at the time of nail penetration.

[3] The second protection layer may further contain a second resin. The second resin is a non-thermoplastic polyimide resin. The second protection layer is considered as being thermally stable as the second protection layer further contains the second resin (non-thermoplastic polyimide resin). Thus, a thermally stable battery is obtained.

[4] The protection layer may further include a third protection layer. The third protection layer is arranged on a surface of the second protection layer. The third protection layer is identical to the first protection layer in composition and thickness. The first protection layer as the third protection layer is arranged on the surface of the second protection layer. As the third protection layer (that is, the first protection layer) is arranged on the surface of the second protection layer, a further thermally stable battery is obtained.

[5] In the battery including the features in [1,] or [2], the first conductive material may be contained by at least 0.5 mass % and at most 50 mass % in the first protection layer, the second conductive material may be contained by at least 5 mass % and at most 50 mass % in the second protection layer, and resin A may be contained by at least 50 mass % and at most 95 mass % in the second protection layer. The first protection layer and the second protection layer may each have a thickness not smaller than 0.1 µm and not greater than 10 µm. By including such features, a battery which achieves both of suppression of increase in temperature of the battery at the time of nail penetration and suppression of increase in resistance of the battery during charging and discharging under a high load is obtained.

[6] In the battery including the features in [3] or [4], the first conductive material may be contained by at least 0.5 mass % and at most 50 mass % in the first protection layer, the second conductive material may be contained by at least 0.5 mass % and at most 50 mass % in the second protection layer, and resin A may be contained by at least 0.1 mass % and at most 30 mass % in the second protection layer. The first protection layer and the second protection layer may each have a thickness not smaller than 0.1 µm and not greater than 10 µm. By including such features, a battery which achieves both of suppression of increase in temperature of the battery at the time of nail penetration and suppression of increase in resistance of the battery during charging and discharging under a high load is obtained.

[7] A difference ($\beta-\alpha$) between a thermal decomposition temperature $\alpha$ of the first resin and a melting point $\beta$ of the positive electrode current collector may be not more than 120° C. By setting a difference ($\beta-\alpha$) between thermal decomposition temperature $\alpha$ of the first resin and melting point $\beta$ of the positive electrode current collector to 120° C. or less, a time period from start of thermal decomposition of the first resin until fusing of the positive electrode current collector is considered to be shorter. It is thus considered that a time period during which the positive electrode current collector is exposed can be shortened and a frequency of contact between the positive electrode current collector and the nail can be reduced. Consequently, suppression of lowering in short-circuiting resistance at the time of nail penetration and noticeable suppression of increase in temperature of the battery at the time of nail penetration are obtained.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
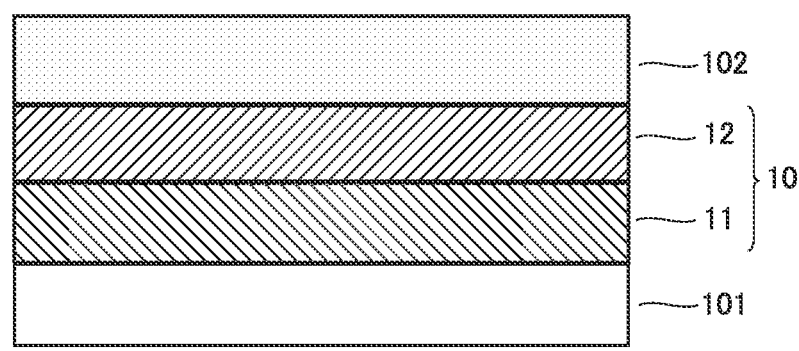
FIG. 1 is a first conceptual cross-sectional view for illustrating a functional mechanism of the present disclosure.

An embodiment of the present disclosure (which is herein denoted as the "present embodiment") will be described below. The description below, however, does not limit the scope of claims.

A lithium ion secondary battery will be described below by way of example. The non-aqueous electrolyte secondary battery in the present embodiment should not be limited to the lithium ion secondary battery. The non-aqueous electrolyte secondary battery in the present embodiment may be, for example, a sodium ion secondary battery or a lithium metal secondary battery.

A non-aqueous electrolyte secondary battery (lithium ion secondary battery) in which protection layer 10 is arranged between a positive electrode current collector 101 and a positive electrode composite material layer 102 is described below. Protection layer 10 may be arranged not only between positive electrode current collector 101 and positive electrode composite material layer 102 but also between a negative electrode current collector 201 and a negative electrode composite material layer 202.

<Non-Aqueous Electrolyte Secondary Battery>

Figure 3:
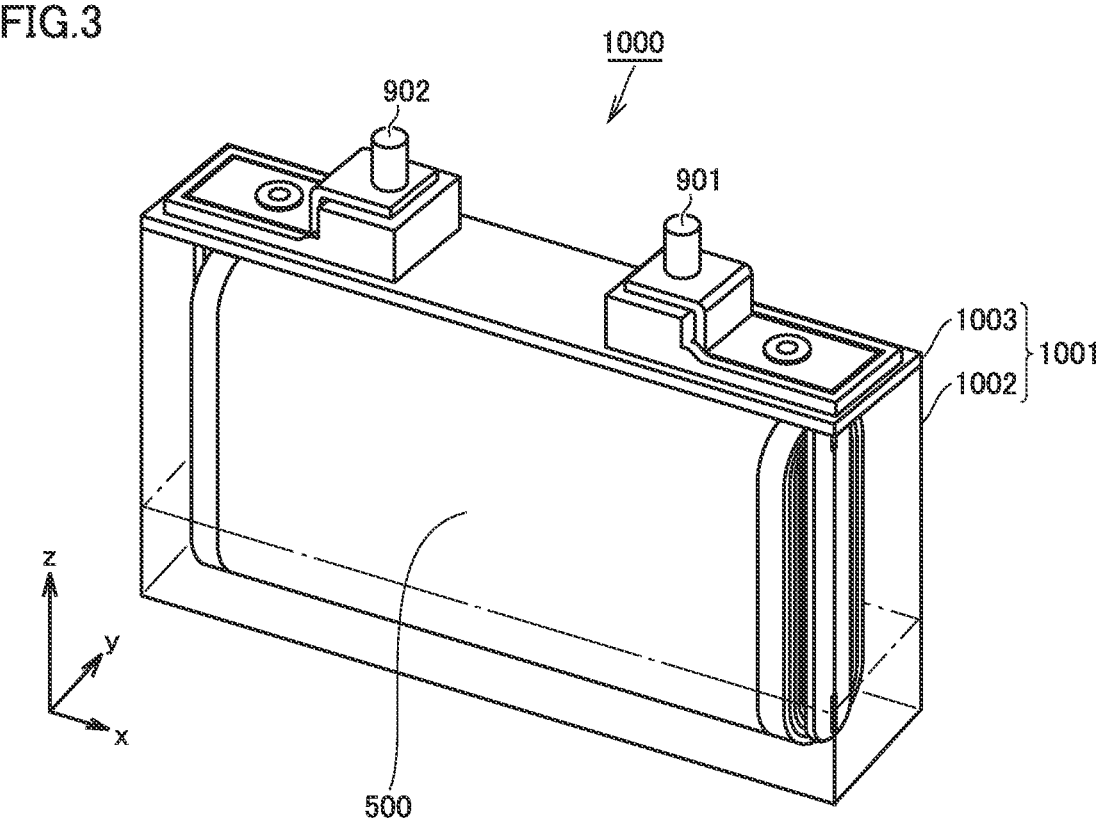
FIG. 3 is a schematic diagram showing one example of a construction of a non-aqueous electrolyte secondary battery in the present embodiment.

FIG. 3 is a schematic diagram showing one example of a construction of a non-aqueous electrolyte secondary battery in the present embodiment.

An outer geometry of a battery 1000 is prismatic. Namely, battery 1000 is a prismatic battery. The battery in the present embodiment, however, should not be limited to the prismatic battery. The battery in the present embodiment may be, for example, a cylindrical battery. Though not shown in FIG. 3, battery 1000 includes at least a positive electrode, a negative electrode, a separator, and a non-aqueous electrolyte.

<<Case>>

Battery 1000 includes a case 1001. Case 1001 is hermetically sealed. Case 1001 can be made, for example, of an aluminum (Al) alloy. So long as case 1001 can hermetically be sealed, the case may be a pouch made of an Al laminated film. Namely, the battery in the present embodiment may be a laminate-type battery.

Case 1001 includes a container, 1002 and a lid 1003. Lid 1003 is joined to container 1002, for example, with laser welding. A positive electrode terminal 901 and a negative electrode terminal 902 are provided in lid 1003. Lid 1003 may further be provided with a liquid introduction port, a gas exhaust valve, and a current interrupt device (none of which is shown).

<<Electrode Array>>

Figure 4:
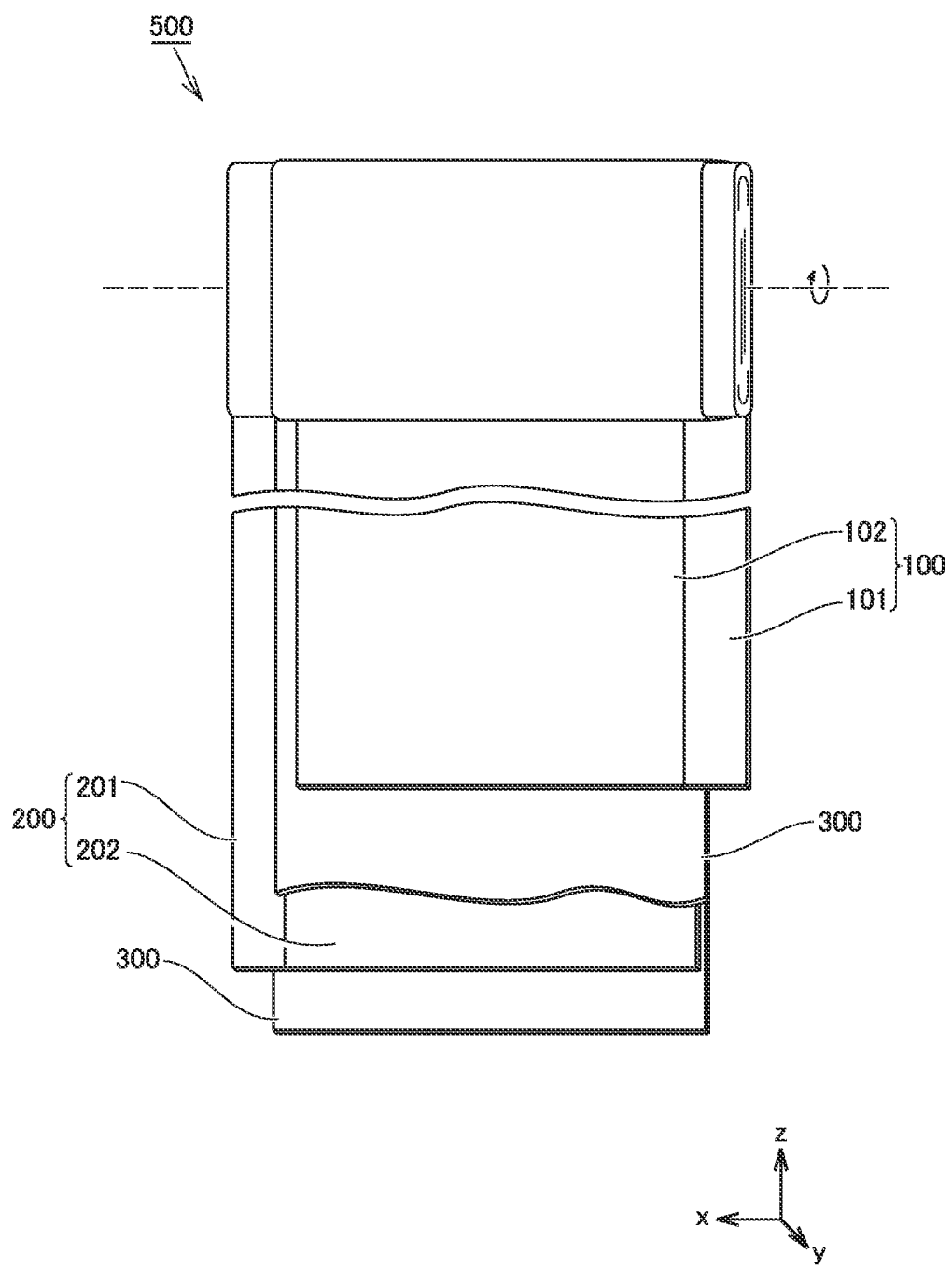
FIG. 4 is a schematic diagram showing one example of a construction of an electrode array in the present embodiment.

FIG. 4 is a schematic diagram showing one example of a construction of an electrode array in the present embodiment.

An electrode array 500 is of a wound type. Electrode array 500 is formed by stacking a positive electrode 100, a separator 300, a negative electrode 200, and separator 300 in this order and further spirally winding the same. The electrode array in the present embodiment should not be limited to the wound type. The electrode array in the present embodiment may be of a stack (layered) type. The electrode array of the stack type can be formed, for example, by alternately stacking positive electrode 100 and negative electrode 200 with separator 300 lying between positive electrode 100 and negative electrode 200.

<<Positive Electrode>>

Figure 5:
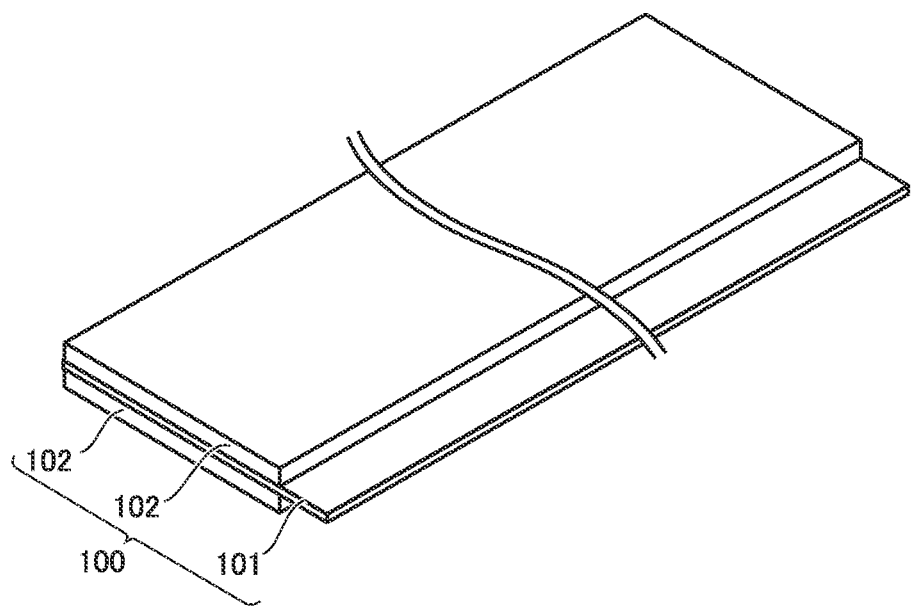
FIG. 5 is a schematic diagram showing one example of a construction of a positive electrode in the present embodiment.

FIG. 5 is a schematic diagram showing one example of a construction of the positive electrode in the present embodiment.

Battery 1000 includes at least positive electrode 100. Positive electrode 100 can be a sheet in a form of a band. Positive electrode 100 includes positive electrode composite material layer 102 and positive electrode current collector 101. Though not shown in FIG. 5, protection layer 10 (FIG. 1) is arranged between positive electrode current collector 101 and positive electrode composite material layer 102. Namely, positive electrode 100 includes positive electrode current collector 101, protection layer 10 (FIG. 1), and positive electrode composite material layer 102.

(Positive Electrode Current Collector)

Positive electrode current collector 101 is a conductive electrode base material. Positive electrode current collector 101 may have a thickness, for example, not smaller than 9 µm and not greater than 17 µm. Positive electrode current collector 101 may be made, for example, of a pure Al foil or an Al alloy foil.

(Positive Electrode Composite Material Layer)

Positive electrode composite material layer 102 is formed on a surface of protection layer 10 (FIG. 1). Positive electrode composite material layer 102 may have a thickness, for example, not smaller than 100 µm and not greater than 200 µm. Positive electrode composite material layer 102 contains at least a positive electrode active material. Positive electrode composite material layer 102 may contain, for example, at least 80 mass % and at most 98 mass % of positive electrode active material, at least 1 mass % and at most 10 mass % of conductive material, and at least 1 mass % and at most 10 mass % of binder.

The positive electrode active material should not particularly be limited. The positive electrode active material may be, for example, $LiCoO_2$, $LiNiO_2$, $LiMnO_2$, $LiMn_2O_4$, $LiNi_{1/3}Co_{1/3}Mn_{1/3}O_2$, $LiNi_{0.82}Co_{0.15}Mn_{0.03}O_2$, or $LiFePO_4$. One type of positive electrode active material alone may be used. Two or more types of positive electrode active materials as being combined may be used. The conductive material and the binder should not particularly be limited. The conductive material may be, for example, acetylene black (AB), furness black, vapor-grown carbon fiber (VGCF), or graphite. The binder may be, for example, polyvinylidene difluoride (PVdF), styrene-butadiene rubber (SBR), or polytetrafluoroethylene (PTFE).

The positive electrode active material may have D50, for example, not smaller than 1 µm and not greater than 30 µm. "D50" herein refers to a particle size at which a cumulative volume of particles from a finer side attains to 50% of the total volume of particles in a volume-based particle size distribution obtained by a laser diffraction and scattering method.

<<Protection Layer>>

As shown in FIG. 1, protection layer 10 is arranged between positive electrode current collector 101 and positive electrode composite material layer 102. Protection layer 10 includes at least a first protection layer 11 and a second protection layer 12.

<<First Protection Layer>>

First protection layer 11 is arranged on a surface of positive electrode current collector 101. First protection layer 11 may be arranged on both of front and rear surfaces of positive electrode current collector 101. First protection layer 11 contains a first conductive material and a first resin. First protection layer 11 may have a thickness, for example, not smaller than 0.1 µm and not greater than 15 µm, or not smaller than 0.1 µm and not greater than 10 µm. When a thickness of first protection layer 11 is smaller than 0.1 µm, it tends to be difficult to form first protection layer 11. When a thickness of first protection layer 11 exceeds 15 µm, a resistance of the battery during charging and discharging under a high load can increase.

(First Conductive Material)

The first conductive material may be, for example, acetylene black (AB), farness black, vapor-grown carbon fiber (VGCF), or artificial graphite. Such a conductive material alone may be used, or two or more types of conductive materials as being combined may be used.

The first conductive material may be contained by at least 0.2 mass % and at most 60 mass %, or by at least 0.5 mass % and at most 50 mass %, in first protection layer 11. As the first conductive material is contained by at least 0.5 mass % and at most 50 mass % in first protection layer 11, a battery which achieves both of suppression of increase in temperature of the battery at the time of nail penetration and suppression of increase in resistance of the battery during charging and discharging under a high load is obtained.

(First Resin)

A non-thermoplastic polyimide resin is adopted as the first resin. The "non-thermoplastic resin" herein represents a resin which does not melt and is not fluidized at a temperature lower than 200° C. The "non-thermoplastic polyimide resin" herein refers to a polymer including an imide group in a repeating unit forming a main chain and having a thermal decomposition temperature not lower than 500° C. The "non-thermoplastic polyimide resin" is not particularly restricted so long as it fulfills characteristics associated with such a thermal decomposition temperature. A difference (β−α) between a thermal decomposition temperature α of the first resin and a melting, point β of positive electrode current collector 101 is not more than 120° C. For example, when an aluminum foil is adopted as positive electrode current collector 101, melting point β of positive electrode current collector 101 is considered as approximately 660° C. In such a case, thermal decomposition temperature α of the first resin is not lower than 540° C.

The "thermal decomposition temperature of the first resin" herein means a temperature at which decrease in weight with thermal decomposition of the first resin start Such a thermal decomposition temperature can be measured with thermal gravity-differential thermal analysis (TG-DTA). An example of a specific measurement condition includes a condition of temperature increase at a rate of 5° C./minute. The "thermal decomposition temperature of the first resin" can be measured based on a heat absorption peak which appears with thermal decomposition.

In a method of synthesizing a polyimide resin with the characteristics above, for example, a precursor (polyamic acid) may be subjected to heat treatment. The polyimide resin may be a polyimide resin derived from polyamic acid. For example, polyamic acid synthesized from a composition containing tetracarboxylic dianhydride and diamine may be employed as polyamic acid. A method of imidization by subjecting polyamic acid obtained by polymerizing pyromellitic acid dihydrate and 4,4'-diaminodiphenyl ether to heat treatment as shown in a reaction formula below represents a typical example of the method of synthesizing a polyimide resin.

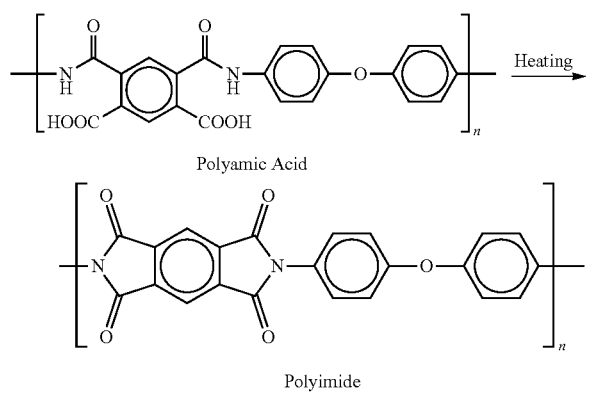

The first resin is smaller in coefficient of thermal expansion than resin A. The first resin may have a coefficient of thermal expansion, for example, not smaller than 10 ppm/° C. and not larger than 60 ppm/° C. The coefficient of thermal expansion of the first resin may be measured, for example, in conformity with JIS K 7197 "testing method for linear thermal expansion coefficient of plastics by thermomechanical analysis."

<<Second Protection Layer>>

Second protection layer 12 is arranged on a surface of first protection layer 11. Second protection layer 12 contains at least a second conductive material and resin A. Second protection layer 12 may have a thickness, for example, not smaller than 0.1 μm and not greater than 15 μm, or not smaller than 0.1 μm and not greater than 10 μm. When a thickness of second protection layer 12 is smaller than 0.1 μm, it tends to be difficult to form second protection layer 12. When a thickness of second protection layer 12 exceeds 15 μm, a resistance of the battery during charging and discharging under a high load can increase.

(Second Conductive Material)

A conductive material similar to the first conductive material may be employed as the second conductive material. Namely, the conductive material may be acetylene black (AB), furness black, vapor-grown carbon fiber (VGCF), or artificial graphite. Such a conductive material alone may be used, or two or more types of conductive materials as being combined may be used.

The second conductive material may be contained in second protection layer 12 in accordance with each of (1) an example in which second protection layer 12 is composed of the second conductive material and resin A, (2) an example in which second protection layer 12 contains a second resin which will be described later in addition to the second conductive material and resin A, and (3) an example in which protection layer 10 includes a third protection layer which will be described later, as shown below.

In the example (1), the second conductive material may be contained by at least 2 mass % and at most 55 mass %, or by at least 5 mass % and at most 50 mass %, in second protection layer 12.

In the example (2), the second conductive material may be contained by at least 0.4 mass % and at most 60 mass %, or by at least 0.5 mass % and at most 50 mass %, in second protection layer 12.

In the example (3), the second conductive material may be contained by at least 0.4 mass % and at most 60 mass %, or by at least 0.5 mass % and at most 50 mass %, in second protection layer 12.

(Resin A)

A thermoplastic resin is adopted as resin A. Resin A is at least one selected from the group consisting of polyvinylidene difluoride (PVDF), polyethylene, polycarbonate, silicone rubber, polyethylene terephthalate, fluorine rubber, and polytetrafluoroethylene (PTFE). Such a resin may be used alone, or two or more types of resins may be used as being combined.

A melting point of resin A is lower than a thermal decomposition temperature of the first resin. The melting point of resin A may be, for example, not lower than 165° C. and not higher than 327° C. A resin other than the above may be employed as resin A so long as its melting point is lower than the thermal decomposition temperature of the first resin. The "melting point of resin A" herein can be measured with thermal gravity-differential thermal analysis (TG-DTA). An example of a specific measurement condition includes a condition of temperature increase at a rate of 5° C./minute. The "melting point of resin A" can be defined by a heat absorption peak which appears with melting.

Resin A is greater in coefficient of thermal expansion than the first resin. The coefficient of thermal expansion of resin A may be, for example, not smaller than 70/° C. and not greater than 300/° C. The coefficient of thermal expansion of resin A may be measured, for example, in conformity with JIS K 7197 "testing method for linear thermal expansion coefficient of plastics by thermomechanical analysis."

Resin A may be contained in second protection layer 12 in accordance with each of (1) an example in which second protection layer 12 is composed of the second conductive material and resin A, (2) an example in which second protection layer 12 contains a second resin which will be described later in addition to the second conductive material and resin A, and (3) an example in which protection layer 10 includes a third protection layer which will be described later, for example, as shown below.

In the example (1), resin A may be contained by at least 45 mass % and at most 98 mass %, or at least 50 mass % and at most 95 mass %, in second protection layer 12.

In the example (2), resin A may be contained by at least 0.05 mass % and at most 40 mass %, or at least 0.1 mass % and at most 30 mass % in second protection layer 12.

In the example (3), resin A may be contained by at least 0.05 mass % and at most 80 mass %, or at least 0.1 mass % and at most 30 mass %, in second protection layer 12.

(Second Resin)

Second protection layer 12 may further contain a second resin. A non-thermoplastic polyimide resin is adopted as the second resin. The non-thermoplastic polyimide resin is not particularly restricted so long as it is a polymer including an imide group in a repeating unit forming a main chain and having a thermal decomposition temperature not lower than 500° C. A resin identical to the first resin may be adopted as the second resin.

<<Third Protection Layer>>

Figure 2:
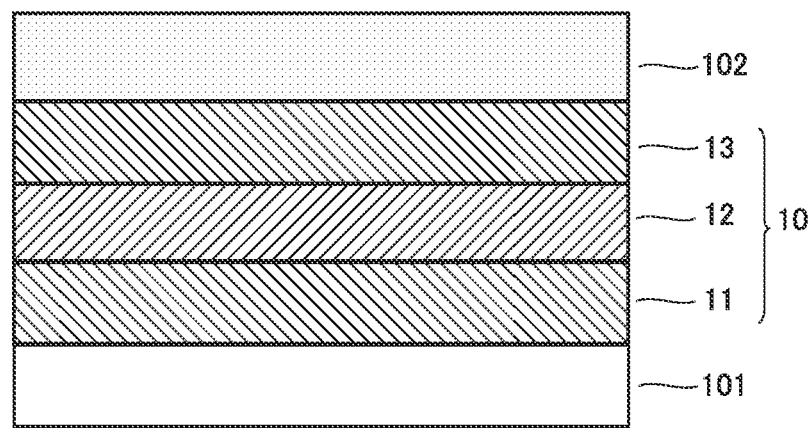
FIG. 2 is a second conceptual cross-sectional view showing some of features of a positive electrode in the present embodiment.

FIG. 2 is a second conceptual cross-sectional view showing some of features of positive electrode 100 in the present disclosure.

As shown in FIG. 2, protection layer 10 may further include a third protection layer 13. Third protection layer 13 is arranged on a surface of second protection layer 12. Positive electrode composite material layer 102 is arranged on a surface of third protection layer 13. Third protection layer 13 contains the first conductive material and the first resin. Third protection layer 13 is not particularly restricted so long as it contains the first conductive material and the first resin. Third protection layer 13 is identical to the first protection layer 11 in composition and thickness. First protection layer 11 as third protection layer 13 may further be arranged on the surface of second protection layer 12. "Third protection layer 13 being identical to first protection layer 11 in composition" herein means that a component contained in third protection layer 13 is identical to a component contained in first protection layer 11 or different from a component contained in first protection layer 11 by 10 mass % or less. "Third protection layer 13 being identical to first protection layer 11 in thickness" herein means that third protection layer 13 is identical in thickness to first protection layer 11 or different in thickness from first protection layer 11 by 10% or less.

<<Negative Electrode>>

Figure 6:
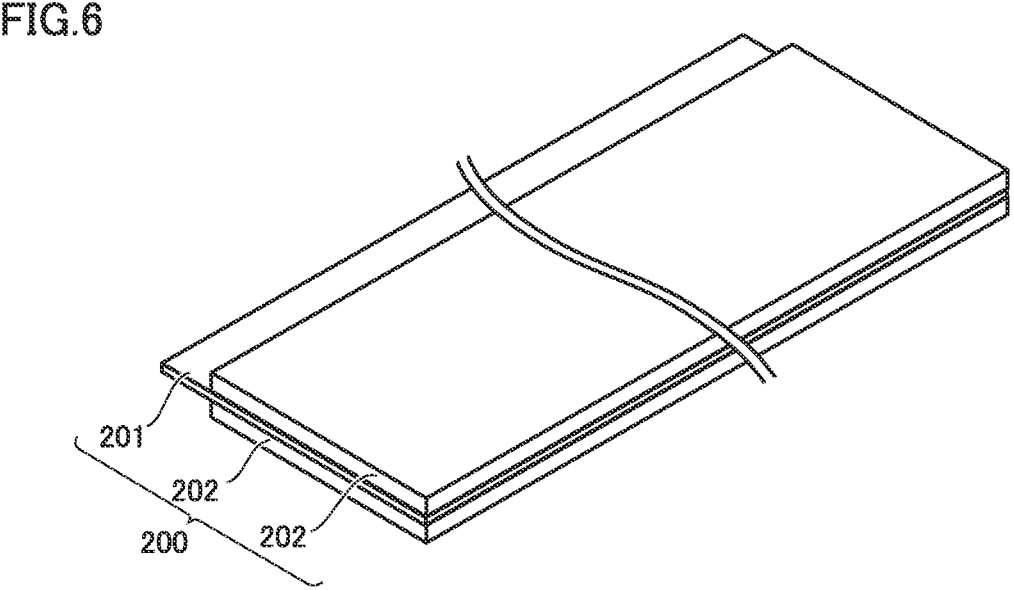
FIG. 6 is a schematic diagram showing one example of a construction of a negative electrode in the present embodiment.

FIG. 6 is a schematic diagram showing one example of a construction of the negative electrode in the present embodiment. Battery 1000 includes at least negative electrode 200. Negative electrode 200 can be a sheet in a form of a band. Negative electrode 200 includes negative electrode current collector 201 and negative electrode composite material layer 202.

(Negative Electrode Composite Material Layer)

Negative electrode composite material layer 202 is formed on a surface of negative electrode current collector 201. Negative electrode composite material layer 202 may be formed on both of front and rear surfaces of negative electrode current collector 201. Negative electrode composite material layer 202 may have a thickness, for example, not smaller than 80 μm and not greater than 250 μm. Negative electrode composite material layer 202 contains at least a negative electrode active material. Negative electrode composite material layer 202 may contain, for example, at least 90 mass % and at most 99 mass % of negative electrode active material and at least 1 mass % and at most 10 mass % of binder.

The negative electrode active material electrochemically occludes and releases charge carriers (lithium ions in the present embodiment). The negative electrode active material should not particularly be limited. The negative electrode active material may be, for example, artificial graphite, natural graphite, soft carbon, hard carbon, silicon, silicon oxide, a silicon-based alloy, tin, tin oxide, or a tin-based alloy. One type of negative electrode active material alone may be used. Two or more types of negative electrode active materials as being combined may be used. The binder should not particularly be limited either. The binder may be, for example, carboxymethyl cellulose (CMC) and styrene-butadiene rubber (SBR). The negative electrode active material may have D50, for example, not smaller than 1 μm and not greater than 30 μm.

(Negative Electrode Current Collector)

Negative electrode current collector 201 is a conductive electrode base material. Negative electrode current collector 201 may have a thickness, for example, not smaller than 5 μm and not greater than 50 μm, or not smaller than 7 μm and not greater than 12 μm. Negative electrode current collector 201 may be made, for example, of a pure copper (Cu) foil or a Cu alloy foil.

<<Separator>>

FIG. 4 is a schematic diagram showing one example of a construction of electrode array 500 in the present embodiment.

As shown in FIG. 4, battery 1000 can include separator 300. Separator 300 is a film in a form of a band. Separator 300 is arranged between positive electrode 100 and negative electrode 200. Separator 300 may have a thickness, for example, not smaller than 5 μm and not greater than 30 μm, or not smaller than 10 μm and not, greater than 30 μm. Separator 300 is porous. Separator 300 electrically isolates positive electrode 100 and negative electrode 200 from each other. Separator 300 may be made, for example, of a porous film composed of PE or PP.

Separator 300 may have, for example, a single-layered structure. For example, separator 300 may be formed only of a porous film composed of PE. Separator 300 may have, for example, a multi-layered structure. Separator 300 may be formed, for example, by stacking a porous film composed of PP, a porous film composed of PE, and a porous film composed of PP in this order. Separator 300 may include a heat-resistant layer on a surface thereof. The heat-resistant layer contains a heat-resistant material. The heat-resistant material may be, for example, alumina or polyimide.

<<Electrolyte Solution>>

Battery 1000 can contain an electrolyte solution. The electrolyte solution contains at least lithium (Li) salt and a solvent. The electrolyte solution may contain, for example, at least 0.5 mol/l and at most 2 mol/l of Li salt. The Li salt is a supporting, electrolyte. The Li salt is dissolved in the solvent. The Li salt may be, for example, $LiPF_6$, LiFSI, $LiBF_4$, $Li[N(FSO_2)_2]$, or $Li[N(CF_3SO_2)_2]$. One type of Li salt alone may be used. Two or more types of Li salt as being, combined may be used.

The solvent is aprotic. Namely, the electrolyte solution in the present embodiment is a non-aqueous electrolyte. The solvent may be, for example, a mixture of cyclic carbonate and chain carbonate. A ratio of mixing may be set, for example, to "cyclic carbonate:chain carbonate=1:9 to 5:5 (at a volume ratio)."

Cyclic carbonate may be, for example, ethylene carbonate (EC), propylene carbonate (PC), butylene carbonate (BC), or fluoroethylene carbonate (FEC). One type of cyclic carbonate may be used alone. Two or more types of cyclic carbonate may be used as being combined.

Chain carbonate may be, for example, dimethyl carbonate (DMC), ethyl methyl carbonate (EMC), or diethyl carbonate (DEC). One type of chain carbonate may be used alone. Two or more types of chain carbonate may be used as being combined.

The solvent may include, for example, lactone, cyclic ether, chain ether, and carboxylate. Lactone may be, for example, γ-butyrolactone (GBL) or δ-valerolactone. Cyclic ether may be, for example, tetrahydrofuran (THF), 1,3-dioxolane, or 1,4-dioxane. Chain ether may be 1,2-dimethoxyethane (DME). Carboxylate may be, for example, methyl formate (MF), methyl acetate (MA), or methyl propionate (MP).

The electrolyte solution may further contain various functional additives in addition to the Li salt and the solvent. The electrolyte solution may contain, for example, at least 1 mass % and at most 5 mass % of functional additive. Examples of the functional additive include a gas generating agent (an overcharge additive) and a solid electrolyte interface (SEI) film forming agent. The gas generating agent may be, for example, cyclohexylbenzene (CHB) or biphenyl (BP). The SEI film forming, agent may be, for example, vinylene carbonate (VC), vinyl ethylene carbonate (VEC), $Li[B(C_2O_4)_2]$, $LiPO_2F_2$, propane sultone (PS), or ethylene sulfite (ES).

<Application>

Battery 1000 in the present embodiment achieves suppression of increase in temperature of the battery at the time of nail penetration. Applications in which such characteristics are made use of include, for example, a power supply for driving for a hybrid vehicle (HV), a plug-in hybrid vehicle (PHV), an electric vehicle (EV), and the like. Applications of battery 1000 in the present embodiment should not be limited to car-mounted applications. Battery 1000 in the present embodiment can be applied to each and every application.

EXAMPLES

Examples of the present disclosure will be described below. The description below does not limit the scope of claims.

Example 1

1. Formation of Protection Layer
Materials below were prepared.
First conductive material: AB
Material for first resin: polyamic acid derived from pyromellitic acid dihydrate and 4,4'-diaminodiphenyl ether
Second conductive material: AB
Resin A: PVDF
Solvent: N-methyl-2-pyrrolidone (NMP)
Positive electrode current collector: Al foil (having a thickness of 15 μm)

(Formation of First Protection Layer)

Slurry was prepared by mixing polyamic acid, AB as the first conductive material, and NMP in a planetary mixer. The slurry was prepared such that a solid content was set to "polyimide resin (first resin):AB (first conductive material)=99.5:0.5" at a mass ratio in formation of first protection layer 11. The slurry was applied to surfaces (both of front and rear surfaces) of positive electrode current collector 101 and dried. Thereafter, polyimide was synthesized from polyamic acid by performing heat treatment at 250° C. in nitrogen for six hours. First protection layer 11 was thus formed on positive electrode current collector 101. First protection layer 11 had a thickness of 2 μm (on one surface after drying).

(Formation of Second Protection Layer)

Slurry was prepared by, mixing PVDF as resin A, AB as the second conductive material, and NMP in a planetary mixer. A ratio of mixing was set to "PVDF:AB=80:20" at a mass ratio. The slurry was applied to a surface of first protection layer 11 arranged on positive electrode current collector 101 and dried. Thereafter, second protection layer 12 was formed on first protection layer 11 by cooling at 35° C. in nitrogen for six hours. Second protection layer 12 had a thickness of 2 μm (on one surface after drying). Protection layer 10 constituted of first protection layer 11 and second protection layer 12 was formed on positive electrode current collector 101 as set forth above.

2. Formation of Positive Electrode Composite Material Layer

Materials below were prepared.
Positive electrode active material: $LiNi_{0.82}Co_{0.15}Mn_{0.03}O_2$ (NCA)
Conductive material: AB
Binder: PVdF
Solvent: NMP
Positive electrode current collector: Al foil having protection layer 10. formed NCA, AB, PVdF, and NMP were mixed in a planetary mixer. Slurry for the positive electrode composite material layer was thus prepared. A solid composition of the slurry for the positive electrode composite material layer was set to "NCA:AB:PVdF=88:10:2" at a mass ratio. The slurry for the positive electrode composite material layer was applied to surfaces of protection layer 10 with a comma coater (trademark) and dried. Positive electrode composite material layer 102 was thus formed.

Positive electrode current collector 101, protection layer 10, and positive electrode composite material layer 102 were compressed by a roller. Positive electrode 100 was prepared as set forth above. Positive electrode composite material layer 102 (on both surfaces) had a thickness of 150 μm.

3. Preparation of Negative Electrode

Materials below were prepared.
Negative electrode active material particles: amorphous coated graphite (particle size (D50): 25 μm)
Binder: SBR and CMC
Solvent: water
Negative electrode current collector: Cu foil (having a thickness of 1.0 μm)

Amorphous coated graphite, SBR, CMC, and water were mixed in a planetary mixer. Slurry for the negative electrode composite material layer was thus prepared. A solid composition of the slurry for the negative electrode composite material layer was set to "amorphous coated graphite:SBR: CMC=98:1:1" at a mass ratio. Negative electrode composite material layer 202 was formed by applying the slurry to surfaces (both of front and rear surfaces) of negative electrode current collector 201 and drying the slurry.

Negative electrode composite material layer 202 and negative electrode current collector 201 were compressed by a roller. Negative electrode 200 was prepared as set forth above. Negative electrode composite material layer 202 (on both surfaces) had a thickness of 160 μm.

4. Preparation of Separator

Materials below were prepared.
Heat-resistant material: boehmite
Binder: acrylic resin
Solvent: water
Separator: porous film composed of PE (having, a thickness of 16 μm)

Slurry was prepared by mixing boehmite, the acrylic resin, and water. A heat-resistant layer was formed by applying the slurry to a surface of separator 300 and drying the slurry. A content of the acrylic resin in the heat-resistant layer was set to 4 mass %. The heat resistant layer had a thickness of 5 μm. Separator 300 was prepared as set forth above.

5. Assembly

Positive electrode 100, separator 300, negative electrode plate 200, and separator 300 were stacked in this order and spirally wound. Electrode array 500 was thus formed. Electrode array 500 was formed to have a flat profile. A width dimension (a dimension in a direction of an X axis in FIGS. 3 and 4) of formed electrode array 500 was set to 130 mm. A height dimension (a dimension in a direction of a Z axis in FIGS. 3 and 4) of formed electrode array 500 was set to 50 mm. A terminal was connected to electrode array 500. Electrode array 500 was accommodated in battery case 1001.

An electrolyte solution composed as below was prepared.
Solvent: [EC:EMC:DMC =3:3:4]
Li salt: $LiPF_6$ (1.1 mol/l)
Additive: $Li[B(C_2O_4)_2]$ and $LiPO_2F_2$ The electrolyte solution was introduced into battery case 1001. Battery case 1001 was hermetically sealed. A battery according to Example 1 was manufactured as set forth above. A capacity ratio (a capacity of the negative electrode/a capacity of the positive electrode) was 1.9.

Examples 2 to 18

Battery 1000 was manufactured as in Example 1 except for change in type of the first conductive material, content of the first conductive material, content of the first resin, thickness of first protection layer 11, type of the second conductive material, content of the second conductive material, content of resin A, and thickness of second protection layer 12 as shown in Table 1 below.

Comparative Example 1

Battery 1000 was manufactured as in Example 1 except for change in content of the first conductive material, content of the first resin, and thickness of first protection layer 11 and absence of second protection layer 12 as shown in Table 1 below.

Comparative Example 2

Battery 1000 was manufactured as in Example 1 except that a content of the first conductive material, a content of the first resin, and a thickness of first protection layer 11 were changed, 20 mass % of polyolefin was contained in first protection layer 11, and second protection layer 12 was not formed as shown in Table 1 below.

Comparative Example 3

Battery 1000 was manufactured as in Example 1 except that a content of the first conductive material, a content of the first resin, and a thickness of first protection layer 11 were changed, 20 mass % of polyolefin was contained in first protection layer 11, and a content of the second conductive material, a type of resin A, a content of resin A, and a thickness of second protection layer 12 were changed as shown in Table 1 below.

Comparative Example 4

Battery 1000 was manufactured as in Example 1 except for change in content of the first conductive material, content of the first resin, type of resin A, and thickness of second protection layer 12 as shown in Table 1 below.

Examples 19 to 41

Battery 1000 was manufactured as in Example 1 except that a prescribed amount of second resin was contained in second protection layer 12 in addition to change in type of the first conductive material, content of the first conductive material, content of the first resin, thickness of first protection layer 11, type of the second conductive material, content of the second conductive material, content of resin A, and thickness of second protection layer 12 as shown in Table 2 below. In Example 41, no second resin was contained in second protection layer 12. A resin identical to the first resin was employed as the second resin.

Examples 42 to 64

Battery 1000 was manufactured as in Example 1 except for arrangement of third protection layer 13 identical in composition and thickness to first protection layer 11 on a surface of second protection layer 12, in addition to change in type of the first conductive material, content of the first conductive material, content of the first resin, thickness of first protection layer 11, type of the second conductive material, content of the second conductive material, type of resin A, content of resin A, and thickness of second protection layer 12 and a prescribed amount of second resin being contained in second protection layer 12 as shown in Table 3 below. In Example 64, no second resin was contained in second protection layer 12. A resin identical to the first resin was employed as the second resin.

Examples 65 to 72

Battery 1000 was manufactured as in Example 1. except for change in content of the first conductive material, content of the first resin, thickness of first protection layer 11, type of resin A, thickness of second protection layer 12, and "β−α" (a difference between thermal decomposition temperature α of the first resin and melting point β of positive electrode current collector 101) as shown in Table 4 below.

Examples 73 to 88

Battery 1000 was manufactured as in Example 1 except that a prescribed amount of second resin was contained in second protection layer 12 in addition to change in content of the first conductive material, content of the first resin, thickness of first protection layer 11, content of the second conductive material, type of resin A, content of resin A, thickness of second protection layer 12, and "β−α" as shown in Table 4 below. A resin identical to the first resin was employed as the second resin.

<Evaluation>

1. Charging and Discharging Under High Load

A series of "charging→rest (pause)→discharging" below was defined as one cycle and one thousand cycles of charging and discharging were repeated.
Charging: 2.5 C×240 seconds
Rest: 120 seconds
Discharging: 30 C×20 seconds "1 C" represents a current at which a full charge capacity is discharged in one hour. For example, "2.5 C" means a current 2.5 times as high as 1 C.

A resistance of the battery was measured after one cycle and one thousand cycles. A rate of increase in resistance was calculated based on an expression: rate of increase in resistance=[resistance of battery after one thousand cycles]÷[resistance of battery after one cycle]×100. Results are shown in the field of "Rate of Increase in Resistance" in Tables 1 to 4 below. A lower rate of increase in resistance indicates higher resistance against charging and discharging under a high load.

2. Nail Penetration Test

A nail (N nail, reference "N65") was prepared. The battery was fully charged. The battery was heated to 60° C. A nail having a shank diameter of 3 mm (N nail, reference "N65") was prepared. The nail was driven into the battery. A temperature of battery case 1001 was monitored at a position distant by 1 cm from a position where the nail was driven. A maximum temperature reached after the nail was driven was measured. Results are shown in the field of "Reached Temperature" in Tables 1 to 4 below. A lower maximum temperature reached indicates further suppression of increase in temperature of the battery in the nail penetration test.

3. Measurement of Thermal Decomposition Temperature and Melting Point

A thermal decomposition temperature of polyimide used for manufacturing of battery 1000 and a melting point of resin A were measured. Conditions for measurement were set such that a rate of temperature increase was set to 5° C./min. and a flow rate of air was set to 200 mL/min. It was thus confirmed that the melting point of resin A was lower than the thermal decomposition temperature of polyimide. Results are shown in the fields of "Thermal Decomposition Temperature" and "Melting Point" in Tables 1 to 4.

4. Measurement of Coefficient of Thermal Expansion

An average coefficient of thermal expansion when a temperature of polyimide and resin A used for manufacturing of battery 1000 was increased from a room temperature (25° C.) to 800° C. was measured with differential dilatometry in an atmosphere in which nitrogen gas flowed. It was thus confirmed that resin A was greater in coefficient of thermal expansion than polyimide. Results are shown in the field of "Expansion Coefficient" in Tables 1 to 4.

TABLE 1

| | First Protection Layer | | | | | Second Protection Layer | | | | | | Second Protection Layer Thickness [μm] | $\beta^{*2} - \alpha$ [° C.] | Rate of Increase in Resistance [%] | Reached Temperature [° C.] |
|---|---|---|---|---|---|---|---|---|---|---|---|---|---|---|---|
| | First Conductive Material | | First Resin (Polyimide Resin) | | | | Second Conductive Material | | Resin A | | | | | | |
| | Type | Content [Mass %] | Thermal Decomposition Temperature α [° C.] | Expansion Coefficient | Content [Mass %] | Thickness [μm] | Type | Content [Mass %] | Type | Melting Point [° C.] | Expansion Coefficient | Content [Mass %] | | | | |
| Example 1 | AB | 0.5 | 500 | <100 ppm | 99.5 | 2 | AB | 20 | PVDF | 165 | 160 | 80 | 2 | 160 | 132 | 182 |
| Example 2 | AB | 10 | 500 | <100 ppm | 90 | 2 | AB | 20 | PVDF | 165 | 160 | 80 | 2 | 160 | 126 | 185 |
| Example 3 | AB | 50 | 500 | <100 ppm | 50 | 2 | AB | 20 | PVDF | 165 | 160 | 80 | 2 | 160 | 120 | 195 |
| Example 4 | AB | 5 | 500 | <100 ppm | 95 | 0.1 | AB | 20 | PVDF | 165 | 160 | 80 | | | | |
| Example 5 | Artificial Graphite | 5 | 500 | <100 ppm | 95 | 1 | AB | 20 | PVDF | 165 | 160 | 80 | | | | |
| Example 6 | AB | 5 | 500 | <100 ppm | 95 | 10 | AB | 20 | PVDF | 165 | 160 | 80 | | | | |
| Example 7 | AB | 5 | 500 | <100 ppm | 95 | 2 | AB | 50 | PVDF | 165 | 160 | 50 | | | | |
| Example 8 | AB | 5 | 500 | <100 ppm | 95 | 2 | Artificial Graphite | 30 | PVDF | 165 | 160 | 70 | | | | |
| Example 9 | AB | 5 | 500 | <100 ppm | 95 | 2 | AB | 5 | PVDF | 165 | 160 | 95 | | | | |
| Example 10 | AB | 5 | 500 | <100 ppm | 95 | 2 | AB | 20 | PVDF | 165 | 160 | 80 | | | | |
| Example 11 | AB | 5 | 500 | <100 ppm | 95 | 2 | Artificial Graphite | 20 | PVDF | 165 | 160 | 80 | | | | |
| Example 12 | AB | 5 | 500 | <100 ppm | 95 | 2 | AB | 20 | PVDF | 165 | 160 | 80 | | | | |
| Example 13 | AB | 0.2 | 500 | <100 ppm | 99.8 | 2 | AB | 20 | PVDF | 165 | 160 | 80 | | | | |
| Example 14 | AB | 60 | 500 | <100 ppm | 40 | 2 | AB | 20 | PVDF | 165 | 160 | 80 | | | | |
| Example 15 | AB | 5 | 500 | <100 ppm | 95 | 15 | AB | 20 | PVDF | 165 | 160 | 80 | | | | |
| Example 16 | AB | 5 | 500 | <100 ppm | 95 | 2 | AB | 55 | PVDF | 165 | 160 | 45 | | | | |
| Example 17 | AB | 5 | 500 | <100 ppm | 95 | 2 | AB | 2 | PVDF | 165 | 160 | 98 | | | | |
| Example 18 | AB | 5 | 500 | <100 ppm | 95 | 2 | AB | 20 | PVDF | 165 | 160 | 80 | | | | |
| Comparative Example 1 | AB | 5 | 500 | <100 ppm | 95 | 3 | — | — | — | — | — | — | | | | |
| Comparative Example 2[*1] | AB | 5 | 500 | <100 ppm | 75 | 3 | — | — | — | — | — | — | | | | |
| Comparative Example 3[*1] | AB | 5 | 500 | <100 ppm | 75 | 3 | AB | 10 | Polyimide | 500 | 54 | 90 | | | | |
| Comparative Example 4 | AB | 5 | 500 | <100 ppm | 95 | 2 | AB | 20 | Polyamide-Imide | 300 | 30 | 80 | | | | |

TABLE 1-continued

|  | | | | |
|---|---|---|---|---|
| Example 4 | 2 | 160 | 120 | 195 |
| Example 5 | 2 | 160 | 121 | 189 |
| Example 6 | 2 | 160 | 127 | 182 |
| Example 7 | 2 | 160 | 120 | 202 |
| Example 8 | 2 | 160 | 120 | 192 |
| Example 9 | 2 | 160 | 121 | 176 |
| Example 10 | 0.1 | 160 | 120 | 202 |
| Example 11 | 1 | 160 | 121 | 195 |
| Example 12 | 10 | 160 | 124 | 189 |
| Example 13 | 2 | 160 | 240 | 195 |
| Example 14 | 2 | 160 | 120 | 260 |
| Example 15 | 2 | 160 | 288 | 195 |
| Example 16 | 2 | 160 | 121 | 260 |
| Example 17 | 2 | 160 | 276 | 208 |
| Example 18 | 15 | 160 | 288 | 195 |
| Comparative Example 1 | — | 160 | 190 | 430 |
| Comparative Example 2[*1] | — | 160 | 195 | 410 |
| Comparative Example 3[*1] | 10 | 160 | 200 | 400 |
| Comparative Example 4 | 15 | 160 | 166 | 390 |

[*1]The first protection layer contained 20 mass % of polyolefin.
[*2]The positive electrode current collector had melting point β of 660° C.

TABLE 2

| | First Protection Layer | | | | | Second Protection Layer | |
|---|---|---|---|---|---|---|---|
| | First Conductive Material | | First Resin (Polyimide Resin) | | | Second Conductive Material | |
| | | | Thermal Decomposition | | | Thick- | |
| | Type | Content [Mass %] | Temperature α [° C.] | Expansion Coefficient | Content [Mass %] | ness [μm] | Type | Content [Mass %] |
| Example 19 | AB | 0.5 | 500 | <100 ppm | 99.5 | 2 | AB | 20 |
| Example 20 | AB | 10 | 500 | <100 ppm | 90 | 2 | AB | 20 |
| Example 21 | AB | 50 | 500 | <100 ppm | 50 | 2 | AB | 20 |
| Example 22 | AB | 5 | 500 | <100 ppm | 95 | 0.1 | AB | 20 |
| Example 23 | Artificial Graphite | 5 | 500 | <100 ppm | 95 | 1 | AB | 20 |
| Example 24 | AB | 5 | 500 | <100 ppm | 95 | 10 | AB | 20 |
| Example 25 | AB | 5 | 500 | <100 ppm | 95 | 2 | AB | 20 |
| Example 26 | AB | 5 | 500 | <100 ppm | 95 | 2 | Artificial Graphite | 20 |
| Example 27 | AB | 5 | 500 | <100 ppm | 95 | 2 | AB | 20 |
| Example 28 | AB | 5 | 500 | <100 ppm | 95 | 2 | AB | 0.5 |
| Example 29 | AB | 5 | 500 | <100 ppm | 95 | 2 | AB | 10 |
| Example 30 | AB | 5 | 500 | <100 ppm | 95 | 2 | AB | 50 |
| Example 31 | AB | 5 | 500 | <100 ppm | 95 | 2 | AB | 20 |
| Example 32 | AB | 5 | 500 | <100 ppm | 95 | 2 | Artificial Graphite | 20 |
| Example 33 | AB | 5 | 500 | <100 ppm | 95 | 2 | AB | 20 |
| Example 34 | AB | 0.2 | 500 | <100 ppm | 99.8 | 2 | AB | 20 |
| Example 35 | AB | 60 | 500 | <100 ppm | 40 | 2 | AB | 20 |
| Example 36 | AB | 5 | 560 | <100 ppm | 95 | 15 | AB | 20 |
| Example 37 | AB | 5 | 500 | <100 ppm | 95 | 2 | AB | 20 |
| Example 38 | AB | 5 | 500 | <100 ppm | 95 | 2 | AB | 20 |
| Example 39 | AB | 5 | 500 | <100 ppm | 95 | 2 | AB | 0.4 |
| Example 40 | AB | 5 | 500 | <100 ppm | 95 | 2 | AB | 60 |
| Example 41 | AB | 5 | 500 | <100 ppm | 95 | 2 | AB | 20 |

| | Second Protection Layer | | | | | Evaluation | | |
|---|---|---|---|---|---|---|---|---|
| | Resin A | | | Second | | | Rate of | Reached |
| | Type | Melting Point [° C.] | Expansion Coefficient | Content [Mass %] | Resin[*1] Content [Mass %] | Thickness [μm] | β[*2]−α [° C.] | Increase in Resistance [%] | Temperature [° C.] |
| Example 19 | PVDF | 165 | 160 | 15 | 65 | 2 | 160 | 127 | 168 |
| Example 20 | PVDF | 165 | 160 | 15 | 65 | 2 | 160 | 121 | 170 |
| Example 21 | PVDF | 165 | 160 | 15 | 65 | 2 | 160 | 115 | 180 |
| Example 22 | PVDF | 165 | 160 | 15 | 65 | 2 | 160 | 115 | 180 |

TABLE 2-continued

| Example | | | | | | | | | |
|---|---|---|---|---|---|---|---|---|---|
| Example 23 | PVDF | 165 | 160 | 15 | 65 | 2 | 160 | 116 | 174 |
| Example 24 | PVDF | 165 | 160 | 15 | 65 | 2 | 160 | 122 | 168 |
| Example 25 | PVDF | 165 | 160 | 0.1 | 79.9 | 2 | 160 | 115 | 186 |
| Example 26 | PVDF | 165 | 160 | 10 | 70 | 2 | 160 | 115 | 178 |
| Example 27 | PVDF | 165 | 160 | 30 | 50 | 2 | 160 | 116 | 162 |
| Example 28 | PVDF | 165 | 160 | 15 | 84.5 | 2 | 160 | 115 | 168 |
| Example 29 | PVDF | 165 | 160 | 15 | 75 | 2 | 160 | 116 | 186 |
| Example 30 | PVDF | 165 | 160 | 15 | 35 | 2 | 160 | 117 | 192 |
| Example 31 | PVDF | 165 | 160 | 15 | 65 | 0.1 | 160 | 115 | 186 |
| Example 32 | PVDF | 165 | 160 | 15 | 65 | 1 | 160 | 116 | 180 |
| Example 33 | PVDF | 165 | 160 | 15 | 65 | 10 | 160 | 118 | 174 |
| Example 34 | PVDF | 165 | 160 | 15 | 65 | 2 | 160 | 230 | 180 |
| Example 35 | PVDF | 165 | 160 | 15 | 65 | 2 | 160 | 115 | 240 |
| Example 36 | PVDF | 165 | 160 | 15 | 65 | 2 | 160 | 276 | 180 |
| Example 37 | PVDF | 165 | 160 | 0.05 | 79.95 | 2 | 160 | 230 | 186 |
| Example 38 | PVDF | 165 | 160 | 40 | 40 | 2 | 160 | 173 | 264 |
| Example 39 | PVDF | 165 | 160 | 15 | 84.6 | 2 | 160 | 242 | 180 |
| Example 40 | PVDF | 165 | 160 | 15 | 25 | 2 | 160 | 117 | 294 |
| Example 41 | PVDF | 165 | 160 | 80 | 0 | 15 | 160 | 276 | 180 |

[1] The polyimide resin the same as in the first protection layer was used.
[2] The positive electrode current collector had melting point β of 660° C.

TABLE 3

| | First Protection Layer and Third Protection Layer[2] | | | | | Second Protection Layer | |
|---|---|---|---|---|---|---|---|
| | First Conductive Material | | First Resin (Polyimide Resin) | | | Second Conductive Material | |
| | | | Thermal Decomposition | | | Thickness | | |
| | Type | Content [Mass %] | Temperature α [° C.] | Expansion Coefficient | Content [Mass %] | [μm] | Type | Content [Mass %] |
| Example 42 | AB | 0.5 | 500 | <100 ppm | 99.5 | 2 | AB | 20 |
| Example 43 | AB | 10 | 500 | <100 ppm | 90 | 2 | AB | 20 |
| Example 44 | AB | 50 | 500 | <100 ppm | 50 | 2 | AB | 20 |
| Example 45 | AB | 5 | 500 | <100 ppm | 95 | 0.1 | AB | 20 |
| Example 46 | Artificial Graphite | 5 | 500 | <100 ppm | 95 | 1 | AB | 20 |
| Example 47 | AB | 5 | 500 | <100 ppm | 95 | 10 | AB | 20 |
| Example 48 | AB | 5 | 500 | <100 ppm | 95 | 2 | AB | 20 |
| Example 49 | AB | 5 | 500 | <100 ppm | 95 | 2 | Artificial Graphite | 20 |
| Example 50 | AB | 5 | 500 | <100 ppm | 95 | 2 | AB | 20 |
| Example 51 | AB | 5 | 500 | <100 ppm | 95 | 2 | AB | 0.5 |
| Example 52 | AB | 5 | 500 | <100 ppm | 95 | 2 | AB | 10 |
| Example 53 | AB | 5 | 500 | <100 ppm | 95 | 2 | AB | 50 |
| Example 54 | AB | 5 | 500 | <100 ppm | 95 | 2 | AB | 20 |
| Example 55 | AB | 5 | 500 | <100 ppm | 95 | 2 | Artificial Graphite | 20 |
| Example 56 | AB | 5 | 500 | <100 ppm | 95 | 2 | AB | 20 |
| Example 57 | AB | 0.2 | 500 | <100 ppm | 99.8 | 2 | AB | 20 |
| Example 58 | AB | 60 | 500 | <100 ppm | 40 | 2 | AB | 20 |
| Example 59 | AB | 5 | 560 | <100 ppm | 95 | 15 | AB | 20 |
| Example 60 | AB | 5 | 500 | <100 ppm | 95 | 3 | AB | 20 |
| Example 61 | AB | 5 | 500 | <100 ppm | 95 | 3 | AB | 20 |
| Example 62 | AB | 5 | 500 | <100 ppm | 95 | 3 | AB | 0.4 |
| Example 63 | AB | 5 | 500 | <100 ppm | 95 | 2 | AB | 60 |
| Example 64 | AB | 5 | 500 | <100 ppm | 95 | 2 | AB | 20 |

| | Second Protection Layer | | | | | | Evaluation | |
|---|---|---|---|---|---|---|---|---|
| | Resin A | | | Second Resin[1] Content [Mass %] | Thickness [μm] | β[3]-α [° C.] | Rate of Increase in Resistance [%] | Reached Temperature [° C.] |
| | Type | Melting Point [° C.] | Expansion Coefficient | Content [Mass %] | | | | | |
| Example 42 | Silicone Rubber | 230 | 300 | 15 | 65 | 2 | 160 | 123 | 154 |
| Example 43 | Silicone Rubber | 230 | 300 | 15 | 65 | 2 | 160 | 118 | 156 |
| Example 44 | Silicone Rubber | 230 | 300 | 15 | 65 | 2 | 160 | 112 | 165 |
| Example 45 | Silicone Rubber | 230 | 300 | 15 | 65 | 2 | 160 | 112 | 165 |
| Example 46 | Silicone Rubber | 230 | 300 | 15 | 65 | 2 | 160 | 113 | 160 |
| Example 47 | Silicone Rubber | 230 | 300 | 15 | 65 | 2 | 160 | 119 | 154 |
| Example 48 | Silicone Rubber | 230 | 300 | 0.1 | 79.9 | 2 | 160 | 112 | 170 |
| Example 49 | Silicone Rubber | 230 | 300 | 10 | 70 | 2 | 160 | 112 | 163 |

TABLE 3-continued

| | | | | | | | | | |
|---|---|---|---|---|---|---|---|---|---|
| Example 50 | Silicone Rubber | 230 | 300 | 30 | 50 | 2 | 160 | 113 | 149 |
| Example 51 | Silicone Rubber | 230 | 300 | 15 | 84.5 | 2 | 160 | 112 | 154 |
| Example 52 | Silicone Rubber | 230 | 300 | 15 | 75 | 2 | 160 | 113 | 171 |
| Example 53 | Silicone Rubber | 230 | 300 | 15 | 35 | 2 | 160 | 114 | 176 |
| Example 54 | Silicone Rubber | 230 | 300 | 15 | 65 | 0.1 | 160 | 112 | 171 |
| Example 55 | Silicone Rubber | 230 | 300 | 15 | 65 | 1 | 160 | 113 | 165 |
| Example 56 | Silicone Rubber | 230 | 300 | 15 | 65 | 10 | 160 | 115 | 160 |
| Example 57 | Silicone Rubber | 230 | 300 | 15 | 65 | 2 | 160 | 224 | 165 |
| Example 58 | Silicone Rubber | 230 | 300 | 15 | 65 | 2 | 160 | 112 | 220 |
| Example 59 | Silicone Rubber | 230 | 300 | 15 | 65 | 2 | 160 | 269 | 165 |
| Example 60 | Silicone Rubber | 230 | 300 | 0.05 | 79.95 | 2 | 160 | 224 | 171 |
| Example 61 | Silicone Rubber | 230 | 300 | 40 | 40 | 2 | 160 | 168 | 242 |
| Example 62 | Silicone Rubber | 230 | 300 | 15 | 84.6 | 2 | 160 | 235 | 165 |
| Example 63 | Silicone Rubber | 230 | 360 | 15 | 25 | 2 | 160 | 114 | 252 |
| Example 64 | Silicone Rubber | 230 | 300 | 80 | 0 | 15 | 160 | 269 | 165 |

[1] The polyimide resin the same as in the first protection layer was used.
[2] The first protection layer and the third protection layer were identical in composition and thickness.
[3] The positive electrode current collector had melting point β of 660° C.

TABLE 4

| | First Protection Layer | | | | | Second Protection Layer | |
|---|---|---|---|---|---|---|---|
| | First Conductive Material | | First Resin (Polyimide Resin) | | | Thickness [μm] | Second Conductive Material | |
| | Type | Content [Mass %] | Thermal Decomposition Temperature α [° C.] | Expansion Coefficient | Content [Mass %] | | Type | Content [Mass %] |
| Example 65 | AB | 7 | 500 | <100 ppm | 93 | 1.8 | AB | 20 |
| Example 66 | AB | 7 | 540 | <100 ppm | 93 | 1.8 | AB | 20 |
| Example 67 | AB | 7 | 610 | <100 ppm | 93 | 1.8 | AB | 20 |
| Example 68 | AB | 7 | 660 | <100 ppm | 93 | 1.8 | AB | 20 |
| Example 69 | AB | 7 | 500 | <100 ppm | 93 | 1.8 | AB | 20 |
| Example 70 | AB | 7 | 500 | <100 ppm | 93 | 1.8 | AB | 20 |
| Example 71 | AB | 7 | 500 | <100 ppm | 93 | 1.8 | AB | 20 |
| Example 72 | AB | 7 | 500 | <100 ppm | 93 | 1.8 | AB | 20 |
| Example 73 | AB | 7 | 500 | <100 ppm | 93 | 1.8 | AB | 17 |
| Example 74 | AB | 7 | 542 | <100 ppm | 93 | 1.8 | AB | 17 |
| Example 75 | AB | 7 | 620 | <100 ppm | 93 | 1.8 | AB | 17 |
| Example 76 | AB | 7 | 650 | <100 ppm | 93 | 1.8 | AB | 17 |
| Example 77 | AB | 7 | 500 | <100 ppm | 93 | 1.8 | AB | 17 |
| Example 78 | AB | 7 | 500 | <100 ppm | 93 | 1.8 | AB | 17 |
| Example 79 | AB | 7 | 500 | <100 ppm | 93 | 1.8 | AB | 17 |
| Example 80 | AB | 7 | 500 | <100 ppm | 93 | 1.8 | AB | 17 |
| Example 81 | AB | 7 | 500 | <100 ppm | 93 | 1.8 | AB | 17 |
| Example 82 | AB | 7 | 545 | <100 ppm | 93 | 1.8 | AB | 17 |
| Example 83 | AB | 7 | 590 | <100 ppm | 93 | 1.8 | AB | 17 |
| Example 84 | AB | 7 | 655 | <100 ppm | 93 | 1.8 | AB | 17 |
| Example 85 | AB | 7 | 500 | <100 ppm | 93 | 1.8 | AB | 17 |
| Example 86 | AB | 7 | 500 | <100 ppm | 93 | 1.8 | AB | 17 |
| Example 87 | AB | 7 | 500 | <100 ppm | 93 | 1.8 | AB | 17 |
| Example 88 | AB | 7 | 500 | <100 ppm | 93 | 1.8 | AB | 17 |

| | Second Protection Layer | | | | | Evaluation | | |
|---|---|---|---|---|---|---|---|---|
| | Resin A | | | Second Resin[1] Content [Mass %] | Thickness [μm] | $\beta^{*2}-\alpha$ [° C.] | Rate of Increase in Resistance [%] | Reached Temperature [° C.] |
| | Type | Melting Point [° C.] | Expansion Coefficient | Content [Mass %] | | | | | |
| Example 65 | PVDF | 165 | 160 | 80 | — | 2.5 | 160 | 122 | 205 |
| Example 66 | PVDF | 165 | 160 | 80 | — | 2.5 | 120 | 122 | 140 |
| Example 67 | PVDF | 165 | 160 | 80 | — | 2.5 | 50 | 122 | 135 |
| Example 68 | PVDF | 165 | 160 | 80 | — | 2.5 | 0 | 122 | 120 |
| Example 69 | Polyethylene | 130 | 180 | 80 | — | 2.5 | 160 | 122 | 200 |
| Example 70 | Polycarbonate | 250 | 70 | 80 | — | 2.5 | 160 | 122 | 240 |
| Example 71 | Silicone Rubber | 230 | 300 | 80 | — | 2.5 | 160 | 122 | 170 |
| Example 72 | PTFE | 327 | 100 | 80 | — | 2.5 | 160 | 122 | 230 |
| Example 73 | PVDF | 165 | 160 | 15 | 68 | 2.5 | 160 | 125 | 193 |
| Example 74 | PVDF | 165 | 160 | 15 | 68 | 2.5 | 118 | 125 | 133 |
| Example 75 | PVDF | 165 | 160 | 15 | 68 | 2.5 | 40 | 125 | 129 |
| Example 76 | PVDF | 165 | 160 | 15 | 68 | 2.5 | 10 | 125 | 122 |
| Example 77 | Polyethylene | 130 | 180 | 15 | 68 | 2.5 | 160 | 125 | 188 |

TABLE 4-continued

| | | | | | | | | | |
|---|---|---|---|---|---|---|---|---|---|
| Example 78 | Polycarbonate | 250 | 70 | 15 | 68 | 2.5 | 160 | 125 | 226 |
| Example 79 | Silicone Rubber | 230 | 300 | 15 | 68 | 2.5 | 160 | 125 | 160 |
| Example 80 | PTFE | 327 | 100 | 15 | 68 | 2.5 | 160 | 125 | 217 |
| Example 81 | Silicone Rubber | 230 | 300 | 15 | 68 | 2.5 | 160 | 125 | 187 |
| Example 82 | Silicone Rubber | 230 | 300 | 15 | 68 | 2.5 | 115 | 125 | 127 |
| Example 83 | Silicone Rubber | 230 | 300 | 15 | 68 | 2.5 | 70 | 125 | 123 |
| Example 84 | Silicone Rubber | 230 | 300 | 15 | 68 | 2.5 | 5 | 125 | 109 |
| Example 85 | PET | 254 | 70 | 15 | 68 | 2.5 | 160 | 125 | 182 |
| Example 86 | Polycarbonate | 250 | 70 | 15 | 68 | 2.5 | 160 | 125 | 219 |
| Example 87 | Fluorine Rubber | 230 | 158 | 15 | 68 | 2.5 | 160 | 125 | 155 |
| Example 88 | PTFE | 327 | 100 | 15 | 68 | 2.5 | 160 | 125 | 210 |

[*1] The polyimide resin the same as in the first protection layer was used.
[*2] The positive electrode current collector had melting point β of 660° C.

<Results>

As shown in Tables 1 to 4, increase in temperature of the battery at the time of nail penetration was suppressed in Examples 1 to 88. Phenomena (1) to (4) below are considered to have occurred at the time of nail penetration. Interaction between these phenomena is considered to have suppressed increase in temperature of the battery at the time of nail penetration.

(1) Short-circuiting occurred in a part as a result of the nail driven into battery 1000 and a temperature locally increased in battery 1000 due to Joule heat.

(2) Resin A contained in second protection layer 12 was higher in expansion coefficient than the first resin contained in first protection layer 11. Therefore, second protection layer 12 containing resin A is considered to have expanded to cover first protection layer 11 with increase in temperature of battery 1000. It is thus considered that separation between first protection layer 11 and second protection layer 12 due to nail penetration was prevented.

(3) The melting point of resin A contained in second protection layer 12 was lower than the thermal decomposition temperature of the first resin contained in first protection layer 11. Resin A is considered to have melted and been liquefied with increase in temperature of battery 1000. Therefore, when a void was produced in first protection layer 11, liquefied resin A contained in second protection layer 12 is considered to have entered the void produced in first protection layer 11 and adhered. It is thus considered that separation of first protection layer 11 from positive electrode current collector 101 due to the void and exposure of positive electrode current collector 101 were prevented.

(4) Molten and liquefied resin A is considered to have adhered to an outer surface of the nail. It is thus considered that lowering in short-circuiting resistance at the time of nail penetration was suppressed and increase in temperature of the battery at the time of nail penetration was suppressed.

1. Discussion About Table 1

Comparative Examples 1 and 2 were high in temperature reached at the time of nail penetration. Since there was no second protection layer 12, first protection layer 11 may have peeled off from positive electrode current collector 101. In addition, it is considered that, since no resin A was contained, molten resin A did not cover the nail and lowering in short-circuiting resistance at the time of nail penetration, was not suppressed.

Comparative Examples 3 and 4 were high in temperature reached at the time of nail penetration. Though these examples included second protection layer 12, polyimide (Comparative Example 3) and polyamide-imide (Comparative Example 4) employed as resin A did not fall under a thermoplastic resin and were small in expansion coefficient. Therefore, second protection layer 12 containing resin A is considered as not having sufficiently expanded to cover first protection layer 11. In addition, resin A (polyimide and polyamide-imide) is considered as not having sufficiently adhered to the outer surface of the nail.

Examples 1 to 12 achieved both of suppression of increase in temperature of the battery at the time of nail penetration and suppression of increase in resistance of the battery at the time of charging, and discharging under a high load. It was shown that, when the second protection layer was composed of the second conductive material and resin A, (a1) to (a4) below were satisfied.

(a1) The first conductive material is contained by at least 0.5 mass % and at most 50 mass % in first protection layer 11.

(a2) The second conductive material is contained by at least 5 mass % and at most 50 mass % in second protection layer 12.

(a3) Resin A is contained by at least 50 mass % and at most 95 mass % in second protection layer 12.

(a4) First protection layer 11 and second protection layer 12 each have a thickness not smaller than 0.1 μm and not greater than 10 μm.

2. Discussion About Table 2

In Examples 19 to 41, increase in temperature of the battery at the time of nail penetration was suppressed. It was shown that the second resin which was a non-thermoplastic polyimide resin might further be contained in second protection layer 12 in addition to resin A.

Examples 19 to 33 achieved both of suppression of increase in temperature of the battery at the time of nail penetration and suppression of increase in resistance of the battery at the time of charging and discharging under a high load. It was shown that, when the second protection layer contained the second conductive material, resin A, and the second resin, (b1) to (b4) below were satisfied.

(b1) The first conductive material is contained by at least 0.5 mass % and at most 50 mass % in first protection layer 11.

(b2) The second conductive material is contained by at least 0.5 mass % and at most 50 mass % in second protection layer 12.

(b3) Resin A is contained by at least 0.1 mass % and at most 30 mass % in second protection layer 12.

(b4) First protection layer 11 and second protection layer 12 each have a thickness not smaller than 0.1 μm and not greater than 10 μm.

3. Discussion About Table 3

In Examples 42 to 64, increase in temperature of the battery at the time of nail penetration was suppressed. It was thus shown that protection layer 10 might further include third protection layer 13 on the surface of second protection layer 12. In Examples 42 to 64, third protection layer 13 is identical in composition and thickness to first protection layer 11.

Examples 42 to 56 achieved both of suppression of increase in temperature of the battery at the time of nail penetration and suppression of increase in resistance of the battery at the time of charging and discharging under a high load. It was shown that, when second protection layer 12 contained the second conductive material, resin A, and the second resin and third protection layer 13 was formed on second protection layer 12, (c1) to (c4) below were satisfied.

(c1) The first conductive material is contained by at least 0.5 mass % and at most 50 mass % in first protection layer 11.

(c2) The second conductive material is contained by at least 0.5 mass % and at most 50 mass % in second protection layer 12.

(c3) Resin A is contained by at least 0.1 mass % and at most 30 mass % in second protection layer 12.

(c4) First protection layer 11 and second protection layer 12 each have a thickness not smaller than 0.1 μm and not greater than 10 μm.

4. Discussion About Table 4

Examples 65 to 88 achieved both of suppression of increase in temperature of the battery at the time of nail penetration and suppression of increase in resistance of the battery at the time of charging and discharging under a high load. It was thus shown that resin A was at least one selected from the group consisting of PVDF, polyethylene, polycarbonate, silicone rubber, polyethylene terephthalate, fluorine rubber, and PTFE.

Examples 66 to 68, 74 to 76, and 82 to 84 achieved noticeable suppression of increase in temperature of the battery at the time of nail penetration. It was shown that difference (β−α) between thermal decomposition temperature α of the first resin and melting point β of positive electrode current collector 101 was not more than 120° C. It is considered that difference (β−α) between thermal decomposition temperature α of the first resin and melting point β of positive electrode current collector 101 was not more than 120° C. in Examples 66 to 68, 74 to 76, and 82 to 84, and hence a time period from start of thermal decomposition of the first resin until fusing of positive electrode current collector 101 was shortened. It is thus considered that a time period during which positive electrode current collector 101 was exposed was shortened and a frequency of contact between positive electrode current collector 101 and the nail was reduced.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A non-aqueous electrolyte secondary battery comprising at least:
   a positive electrode;
   a negative electrode;
   a separator; and
   a non-aqueous electrolyte,
   the positive electrode including
     a positive electrode current collector,
     a protection layer, and
     a positive electrode composite material layer,
   the protection layer being arranged between the positive electrode current collector and the positive electrode composite material layer,
   the protection layer including at least a first protection layer, a second protection layer, and a third protection layer,
   the first protection layer being arranged on a surface of the positive electrode current collector,
   the first protection layer containing a first conductive material and a first resin,
   the first resin being a non-thermoplastic polyimide resin,
   the second protection layer being arranged on a surface of the first protection layer,
   the second protection layer containing at least a second conductive material and a resin A,
   the resin A being a thermoplastic resin,
   a melting point of the resin A being lower than a thermal decomposition temperature of the first resin,
   the resin A being greater in expansion coefficient than the first resin,
   the third protection layer is arranged on a surface of the second protection layer, where the second protection layer is between the first protection layer and the third protection layer, and
   the third protection layer comprises the first conductive material and the first resin.

2. The non-aqueous electrolyte secondary battery according to claim 1, wherein
   the resin A is at least one selected from the group consisting of polyvinylidene difluoride (PVDF), polyethylene, polycarbonate, silicone rubber, polyethylene terephthalate (PET), fluorine rubber, and polytetrafluoroethylene (PTFE).

3. The non-aqueous electrolyte secondary battery according to claim 1, wherein
   the second protection layer further contains a second resin, and
   the second resin is a non-thermoplastic polyimide resin.

4. The non-aqueous electrolyte secondary battery according to claim 3, wherein
   the first conductive material is contained by at least 0.5 mass % and at most 50 mass % in the first protection layer,
   the second conductive material is contained by at least 0.5 mass % and at most 50 mass % in the second protection layer,
   the resin A is contained by at least 0.1 mass % and at most 30 mass % in the second protection layer, and
   the first protection layer and the second protection layer each have a thickness not smaller than 0.1 μm and not greater than 10 μm.

5. The non-aqueous electrolyte secondary battery according to claim 1, wherein
   the third protection layer is identical to the first protection layer in composition and thickness.

6. The non-aqueous electrolyte secondary battery according to claim 1, wherein
   the first conductive material is contained by at least 0.5 mass % and at most 50 mass % in the first protection layer,
   the second conductive material is contained by at least 5 mass % and at most 50 mass % in the second protection layer,
   the resin A is contained by at least 50 mass % and at most 95 mass % in the second protection layer, and the first protection layer and the second protection layer each have a thickness not smaller than 0.1 μm and not greater than 10 μm.

7. The non-aqueous electrolyte secondary battery according to claim 1, wherein
a difference (β-α) between the thermal decomposition temperature α of the first resin and a melting point β of the positive electrode current collector is not more than 120.

* * * * *

UNITED STATES PATENT AND TRADEMARK OFFICE
CERTIFICATE OF CORRECTION

PATENT NO. : 10,903,515 B2
APPLICATION NO. : 16/253923
DATED : January 26, 2021
INVENTOR(S) : Koji Torita et al.

It is certified that error appears in the above-identified patent and that said Letters Patent is hereby corrected as shown below:

In the Specification

In Column 3, Line(s) 31, delete "[1,]" and insert --[1]--, therefor.

In Column 6, Line(s) 40, delete "farness" and insert --furness--, therefor.

In Column 6, Line(s) 54, delete "Anon-thermoplastic" and insert --A non-thermoplastic--, therefor.

In Column 6, Line(s) 65, after "melting", delete ",".

In Column 7, Line(s) 7, after "resin", delete "start" and insert --starts.--, therefor.

In Column 10, Line(s) 30, after "not", delete ",".

In Column 10, Line(s) 42, after "thereof", insert --.--.

In Column 10, Line(s) 50, after "supporting", delete ",".

In Column 10, Line(s) 54, after "being", delete ",".

In Column 12, Line(s) 24, after "10", delete ".".

In Column 12, Line(s) 66, after "having", delete ",".

In Column 14, Line(s) 41, after "Example 1", delete ".".

In Column 23, Line(s) 59, after "penetration", delete ",".

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*